(12) United States Patent
Takeuchi (10) Patent No.: US 8,699,093 B2
(45) Date of Patent: Apr. 15, 2014

(54) IMAGE READING APPARATUS AND OPTICAL UNIT

(75) Inventor: Hideo Takeuchi, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 23 days.

(21) Appl. No.: 13/605,250

(22) Filed: Sep. 6, 2012

(65) Prior Publication Data

US 2013/0250373 A1 Sep. 26, 2013

(30) Foreign Application Priority Data

Mar. 26, 2012 (JP) ................................ 2012-070444

(51) Int. Cl.
*H04N 1/04* (2006.01)
(52) U.S. Cl.
USPC ............ 358/474; 358/475; 358/509; 362/608
(58) Field of Classification Search
USPC ......... 358/474, 475, 509, 482, 483, 484, 442; 362/608
See application file for complete search history.

(56) References Cited

U.S. PATENT DOCUMENTS

| 7,042,599 | B2 * | 5/2006 | Yokota et al. | 358/475 |
| 7,728,905 | B2 * | 6/2010 | Tanaka et al. | 348/370 |
| 7,843,612 | B2 * | 11/2010 | Kimura et al. | 358/474 |
| 7,852,525 | B2 * | 12/2010 | Nogami et al. | 358/497 |
| 8,466,383 | B2 * | 6/2013 | Cheng et al. | 200/314 |
| 8,477,385 | B2 * | 7/2013 | Takahashi et al. | 358/474 |
| 8,482,819 | B2 * | 7/2013 | Schmidt et al. | 358/475 |

FOREIGN PATENT DOCUMENTS

JP 2010-178350 A 8/2010

* cited by examiner

*Primary Examiner* — Negussie Worku
(74) *Attorney, Agent, or Firm* — Sughrue Mion, PLLC (57) ABSTRACT

An image reading apparatus includes a body; a circuit board fixed to the body; a light emitter disposed on a first surface of the circuit board, the light emitter emitting light with which a document is irradiated; a light guide disposed opposite the circuit board with the light emitter therebetween, the light emitted from the light emitter passing through the light guide; an urging unit; a supporting unit fixed to the body; and a pressing unit. The pressing unit includes a first portion and a second portion. The first portion is pressed in a direction from the light emitter toward the light guide as a result of receiving a force from the urging unit. The second portion presses the light guide against the light emitter as a result of receiving a reaction force from the supporting unit when the first portion is pressed.

5 Claims, 7 Drawing Sheets

IMAGE READING APPARATUS AND OPTICAL UNIT

CROSS-REFERENCE TO RELATED APPLICATIONS

This application is based on and claims priority under 35 USC 119 from Japanese Patent Application No. 2012-070444 filed Mar. 26, 2012.

BACKGROUND

Technical Field

The present invention relates to an image reading apparatus and an optical unit.

SUMMARY

According to an aspect of the invention, an image reading apparatus includes a body; a circuit board fixed to the body; a light emitter disposed on a first surface of the circuit board, the light emitter emitting light with which a document is irradiated; a light guide disposed opposite the circuit board with the light emitter therebetween, the light emitted from the light emitter passing through the light guide; an urging unit; a supporting unit fixed to the body; and a pressing unit. The pressing unit includes a first portion and a second portion. The first portion is pressed in a direction from the light emitter toward the light guide as a result of receiving a force from the urging unit. The second portion presses the light guide against the light emitter as a result of receiving a reaction force from the supporting unit when the first portion is pressed.

BRIEF DESCRIPTION OF THE DRAWINGS

An exemplary embodiment of the present invention will be described in detail based on the following figures, wherein.

DETAILED DESCRIPTION

Structure of Image Reading Apparatus 1

Hereinafter, an exemplary embodiment of the present invention will be described in detail with reference to the drawings.

Figure 1:
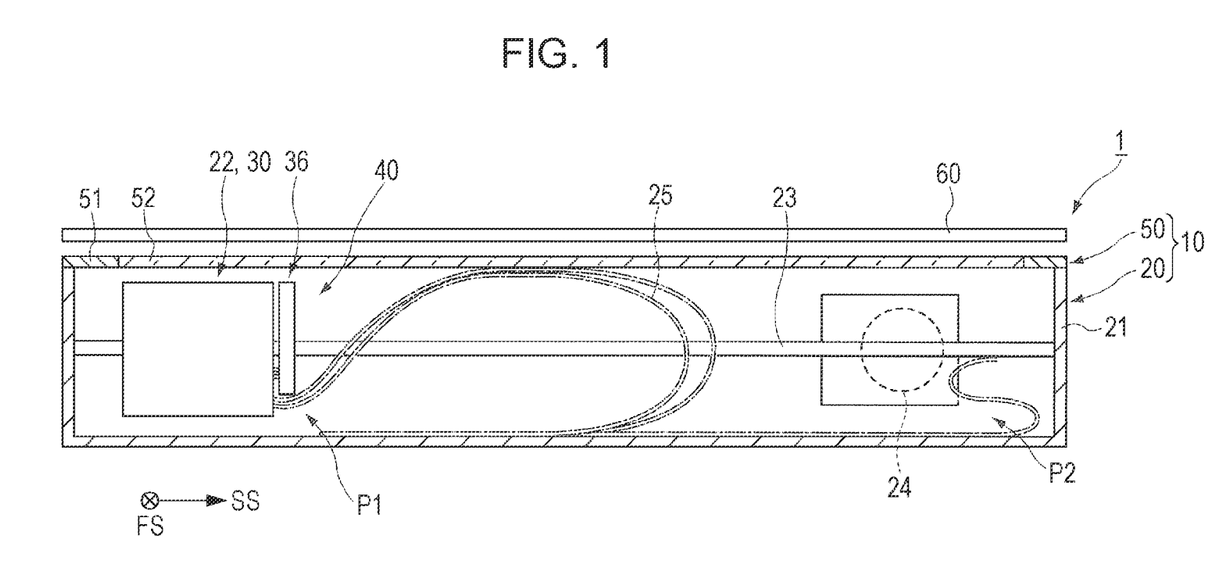
FIG. 1 is a side view illustrating an example of the structure of an image reading apparatus according to the present exemplary embodiment.

FIG. 1 is a side view illustrating an example of the structure of an image reading apparatus 1 according to the present exemplary embodiment. FIG. 1 illustrates the image reading apparatus 1 seen from the front side.

The image reading apparatus 1 includes a body 10 and a platen cover 60. The body 10 includes a mechanism for reading an image of a document fixed in place. The platen cover 60 is attached to the body 10 so as to be openable and closable. When being closed, the platen cover 60 fixes the document in place. The body 10 includes a reading section 20 that reads an image of the document and a document table 50 for placing the document thereon.

The reading section 20 includes a lower housing 21 and a reading unit 40. The lower housing 21 has a bottom surface, side surfaces, and an opening formed in an upper part thereof. The reading unit 40 is disposed in the lower housing 21. The reading section 20 further includes a guide shaft 23 and a drive motor 24. The guide shaft 23 guides the reading unit 40 in a sub-scanning direction SS and in the opposite direction in the lower housing 21. The drive motor 24 moves the reading unit 40 along the guide shaft 23.

The reading unit 40 includes an irradiation light guide unit 22 (described below in detail), which includes an optical system 30 (described below in detail). The irradiation light guide unit 22 emits light and guides the light toward a document. The reading unit 40 further includes a light-receiving unit 36 (described below in detail), which is disposed downstream of the irradiation light guide unit 22 in the sub-scanning direction SS. The light-receiving unit 36 receives light reflected from a document. To be specific, in the present exemplary embodiment, the irradiation light guide unit 22 and the light-receiving unit 36 are joined to each other, and the irradiation light guide unit 22 and the light-receiving unit 36 are movable in the sub-scanning direction SS of the reading unit 40 and in the opposite direction.

The reading section 20 further includes a cable unit 25 including plural electric wires. One end of the cable unit 25 is attached to the lower housing 21, and the other end of the cable unit 25 is attached to the reading unit 40. Electric power is supplied to the reading unit 40 through the cable unit 25, and signals that are sent to or output from the reading unit 40 pass through the cable unit 25.

The reading unit 40 of the reading section 20 is normally disposed at a home position P1 illustrated in FIG. 1. When reading a document, the reading unit 40 moves in the sub-scanning direction SS to an end position P2, which is located at the downstream end in the sub-scanning direction SS, and subsequently returns to the home position P1. In the following description, the term "main scanning direction FS" refers to a direction from the front side toward the rear side in FIG. 1.

The document table 50 includes an upper frame 51 and a document plate 52. The upper frame 51, which has a frame-like shape, is attached to the open side of the lower housing 21 and form a housing together with the lower housing 21. The document plate 52 is held in the upper frame 51 and used to place a document thereon. The document plate 52 is made of a glass material that transmits visible light. The document plate 52 is disposed so as to cover the moving range of the reading unit 40 of the reading section 20.

Structure of Optical Components of Reading Unit 40

Figure 2:
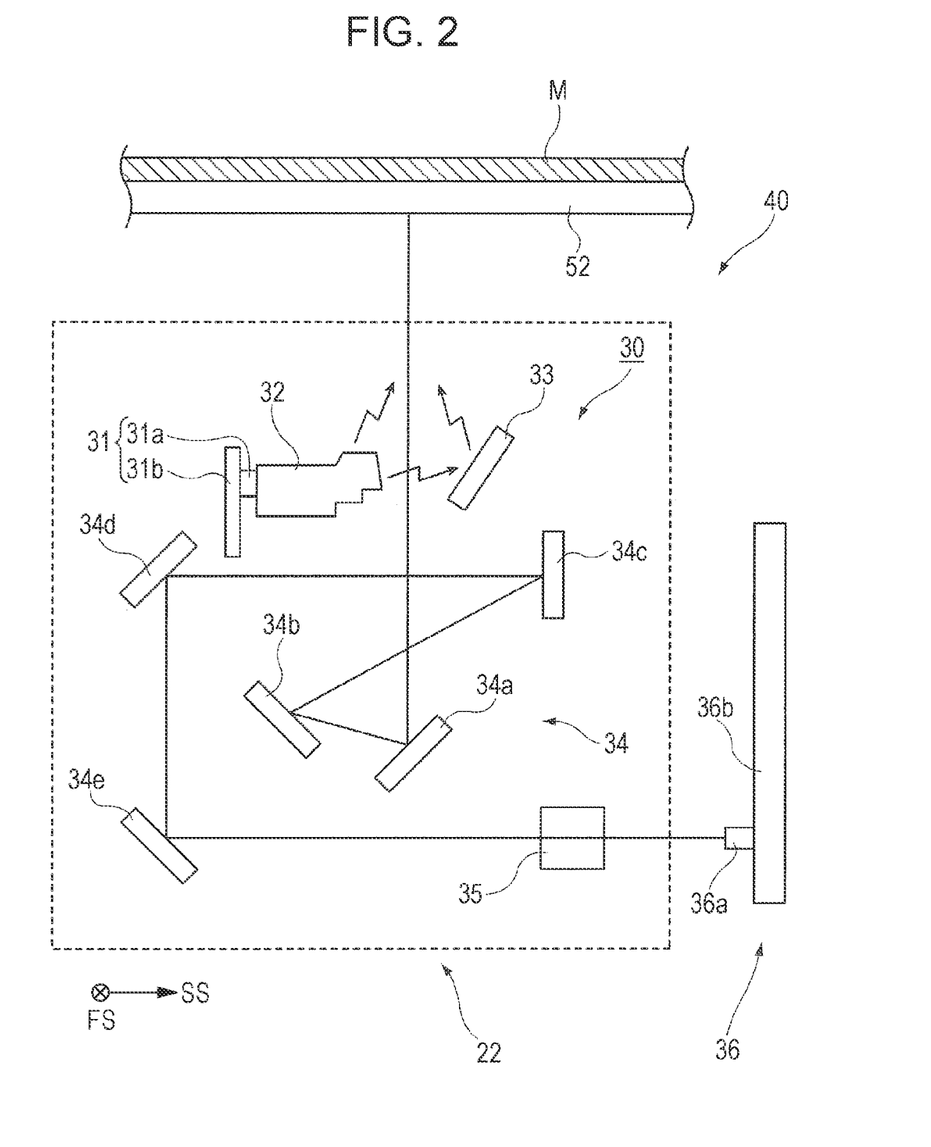
FIG. 2 illustrates an example of the structure of optical components of a reading unit.

Next, the structure of optical components of the reading unit 40, which is an example of an optical unit, will be described. FIG. 2 illustrates an example of the structure of optical components of the reading unit 40.

As described above, the reading unit 40 includes the irradiation light guide unit 22 and the light-receiving unit 36. The light-receiving unit 36 is located downstream of the irradiation light guide unit 22 in the sub-scanning direction SS.

The irradiation light guide unit 22, which is an example of an irradiation structure and a light guide structure, includes the optical system 30. To be specific, the irradiation light guide unit 22 includes a light emitter 31 that emits visible light. The light emitter 31 includes a light emitting element array 31a and a light-emitting-side circuit board 31b. The light emitting element array 31a includes plural light emitting elements (for example, light emitting diodes (LEDs)), which are arranged in the main scanning direction FS. The light emitting element array 31a is soldered to the light-emitting-side circuit board 31b, which is fixed to the reading unit 40. The irradiation light guide unit 22 includes a light guide 32 and a reflector 33 (described below). The light guide 32 diffuses highly directional light emitted from the light emitter 31 and guides a part of the light toward the document plate 52 and a part of the light toward the reflector 33. The reflector 33 reflects, toward the document plate 52, the part of light that has been emitted from the light emitter 31 and guided by the light guide 32 toward the reflector 33. The irradiation light guide unit 22 further includes mirrors (a first mirror 34a, a second mirror 34b, a third mirror 34c, a fourth mirror 34d, and a fifth mirror 34e). The mirrors 34 successively reflect light that has been emitted from the light emitter 31, reflected by a document M through the document plate 52, and has passed through the document plate 52. The irradiation light guide unit 22 includes a lens 35 that focuses the light reflected by the fifth mirror 34e.

The light-receiving unit 36, which is independent from the irradiation light guide unit 22, receives the light that has been focused by the lens 35 to form an image. That is, the light-receiving unit 36 includes a light receiving element array 36a and a light-receiving-side circuit board 36b. The light receiving element array 36a (for example, a charge coupled device (CCD) image sensor) includes plural light receiving elements that are arranged in the main scanning direction FS. The light receiving element array 36a is mounted on the light-receiving-side circuit board 36b, which is fixed to the reading unit 40.

In the present exemplary embodiment, a so-called folded optical system, in which light reflected from the document M travels along a self-intersecting path, is used as the optical system 30 of the reading unit 40, and thereby the size of the reading unit 40 is reduced.

Structure of Reading Section 20

Figure 3:
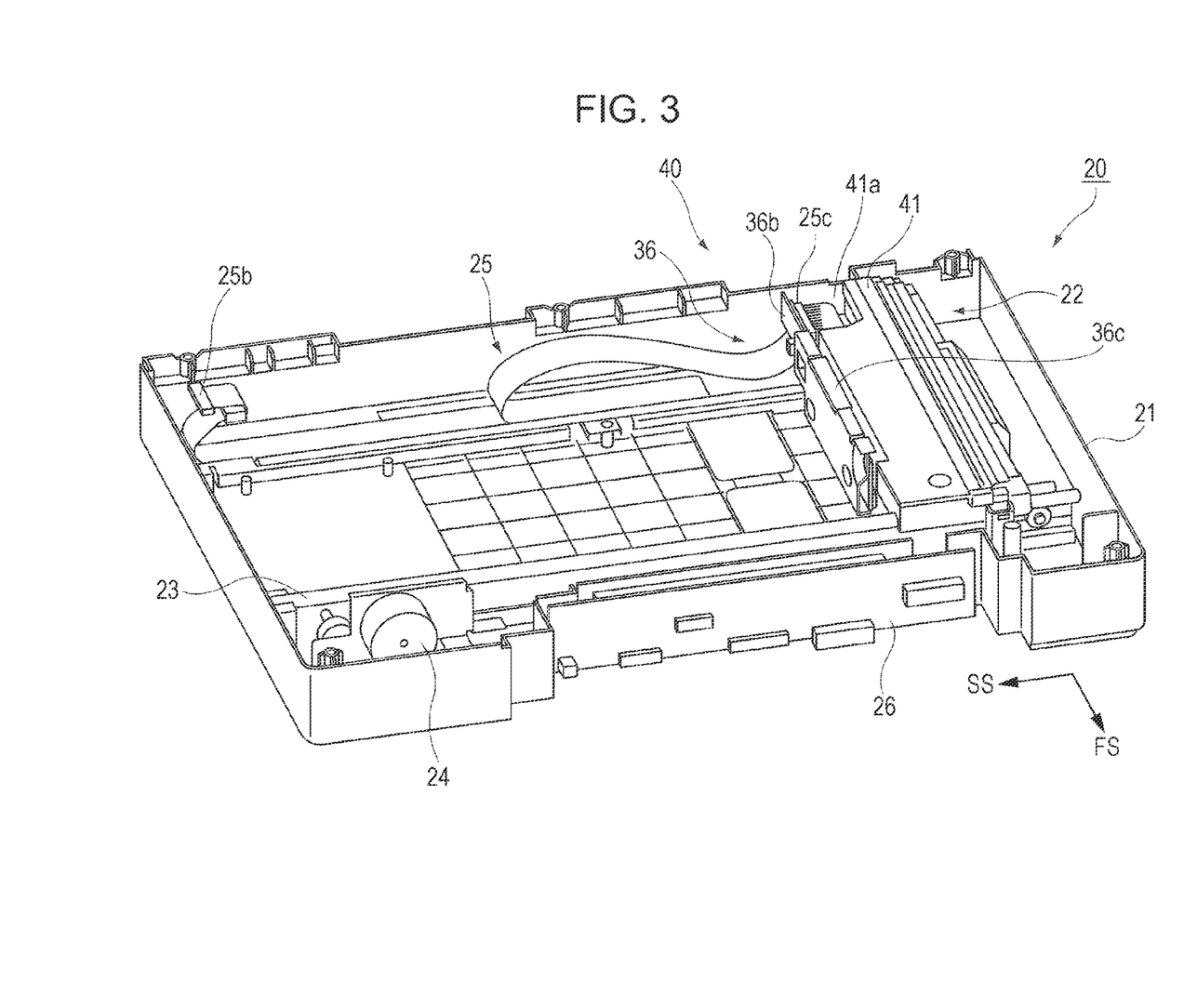
FIG. 3 is a perspective view illustrating an example of the structure of a reading section.

FIG. 3 is a perspective view illustrating an example of the structure of the reading section 20. The front side in FIG. 1 corresponds to the rear side in FIG. 3. Therefore, the reading unit 40 illustrated in FIG. 3 is located at the home position P1 illustrated in FIG. 1.

In the present exemplary embodiment, the guide shaft 23 is disposed in a rear part (a front part in FIG. 3) of the lower housing 21 so as to extend in the sub-scanning direction SS. Both ends of the guide shaft 23 are fixed to the lower housing 21. The drive motor 24 is disposed at a position in the lower housing 21 that is in the rear of the guide shaft 23 and downstream of the guide shaft 23 in the sub-scanning direction SS. An interface unit 26 is attached to an outer rear surface of the lower housing 21. The image reading apparatus 1 is electrically connected to an external apparatus through the interface unit 26.

The cable unit 25 is disposed in a front part (a rear part in FIG. 3) of the lower housing 21 so as to extend in the sub-scanning direction SS. A first connector 25b of the cable unit 25 is disposed at a position in the lower housing 21 that is in a front part and at a downstream end of the lower housing 21 in the sub-scanning direction SS. A second connector 25c of the cable unit 25 is attached to a front part of the light-receiving unit 36 of the reading unit 40, which is disposed in the lower housing 21. The first connector 25b is electrically connected to the interface unit 26 through a connection device (not shown) and the like.

Structure of Reading Unit 40

Figure 4:
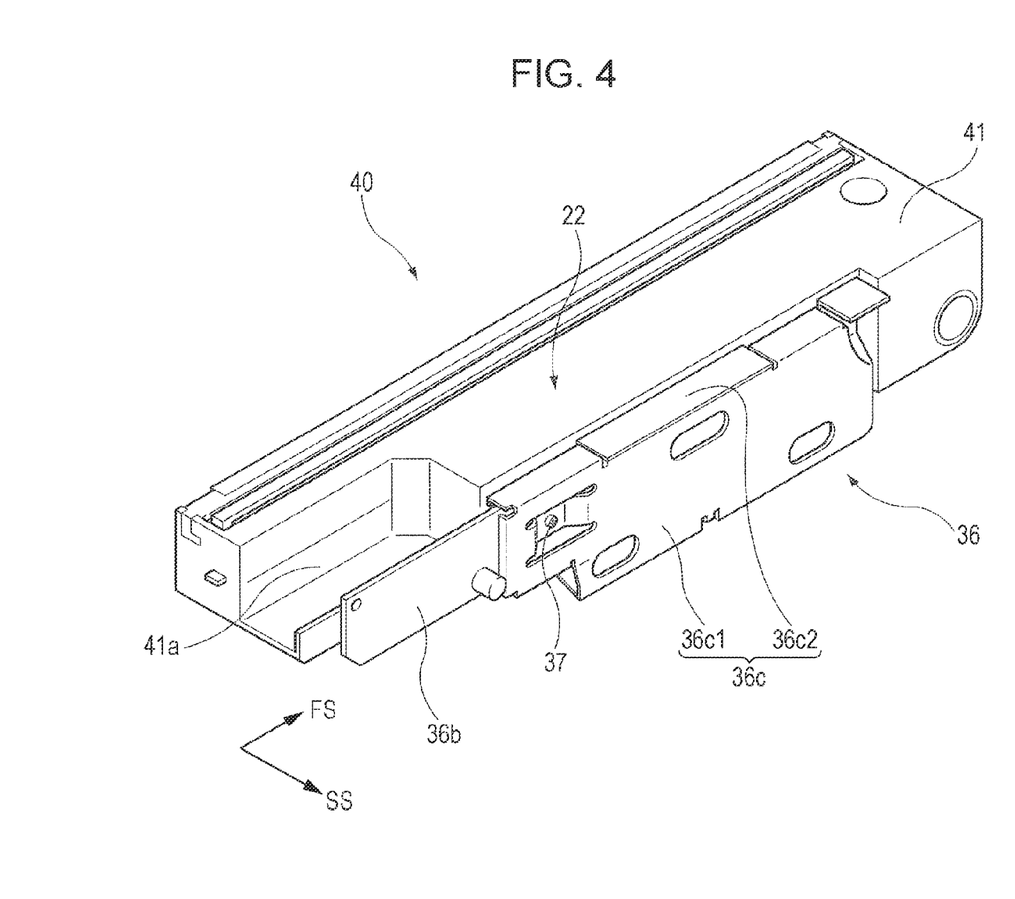
FIG. 4 is a perspective view illustrating an example of the structure of the reading unit.

Referring to FIGS. 3 and 4, the structure of the reading unit 40 will be described. FIG. 4 is a perspective view illustrating an example of the structure of the reading unit 40.

The irradiation light guide unit 22 of the reading unit 40 includes an optical housing 41. The optical housing 41 contains the optical system 30 (the light emitter 31, the light guide 32, the reflector 33, the mirrors 34, the lens 35, and the like) and a holding mechanism 100 (described below in detail) that holds the light emitter 31 and the light guide 32. The optical housing 41 has a recess 41a formed at a position that is in a front part and on the downstream side in the sub-scanning direction SS. In the present exemplary embodiment, the optical housing 41 is made of a non-electroconductive material (for example, a plastic such as polypropylene (PP), polystyrene (PS), a polyacetal resin (POM), or the like).

The light-receiving unit 36, which is joined to the irradiation light guide unit 22, includes the light-receiving-side circuit board 36b and a circuit board housing 36c that covers the light-receiving-side circuit board 36b. In the present exemplary embodiment, the circuit board housing 36c is disposed downstream of the recess 41a of the optical housing 41 in the sub-scanning direction SS. The circuit board housing 36c has a size such that a part of the light-receiving-side circuit board 36b protrudes (so as to be exposed) toward the front side from the circuit board housing 36c. The light-receiving-side circuit board 36b and the circuit board housing 36c are attached to the reading unit 40 by using a bolt 37. The position and the angle of the light-receiving-side circuit board 36b may be adjusted by rotating and unfastening the bolt 37.

As described above, the optical system 30 of the irradiation light guide unit 22 (see FIG. 2) is disposed inside the optical housing 41 and the light-receiving-side circuit board 36b is disposed outside the optical housing 41. Therefore, even when the temperature of the light receiving element array 36a mounted on the light-receiving-side circuit board 36b increases while the image reading apparatus 1 is operated, the temperature of the optical system 30 of the irradiation light guide unit 22 does not substantially increase. To be specific, the distances between the components of the optical system 30 in the optical axis direction and the indices of refraction of the light guide 32 and the lens 35 do not substantially change, because the temperature of the optical system 30 does not substantially increase. Moreover, heat is dissipated more smoothly because the light-receiving-side circuit board 36b is disposed outside the optical housing 41. As a result, increase in the temperature of the light receiving element array 36a is smaller than in a case where the light-receiving-side circuit board 36b is disposed inside the optical housing 41.

The circuit board housing 36c is made of an electroconductive material, such as a stainless steel, aluminium, or another metal. The circuit board housing 36c is grounded through the bolt 37 and the like. In the present exemplary embodiment, a first housing member 36c1 and a second housing member 36c2 of the circuit board housing 36c are each made by bending a plate-shaped member (metal plate) so that the circuit board housing 36c covers the light-receiving-side circuit board 36b as illustrated in FIG. 4.

Structure of Holding Mechanism 100

Figure 5A:
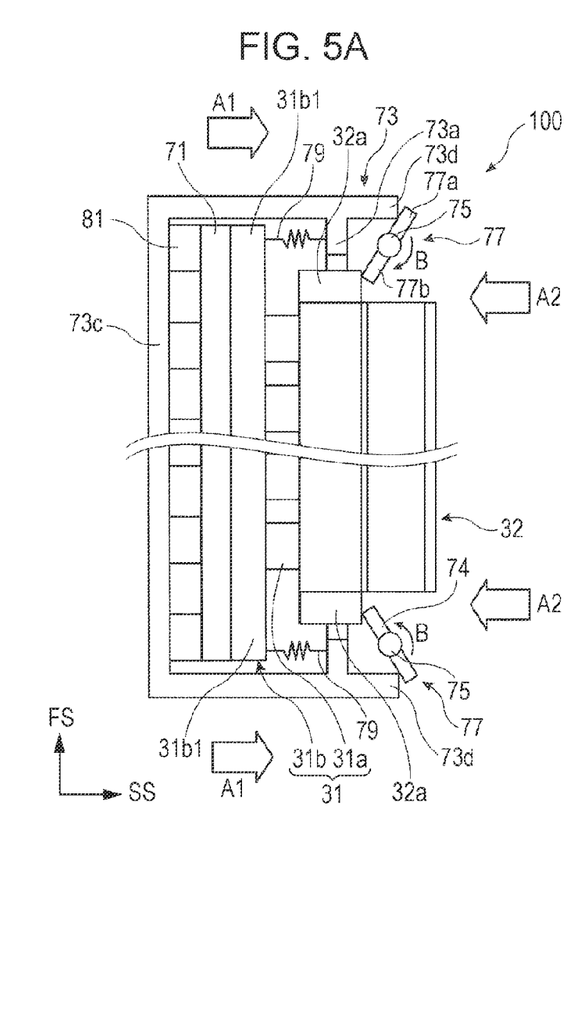
FIGS. 5A and 5B illustrate an example of the structure of a holding mechanism.
Figure 5B:
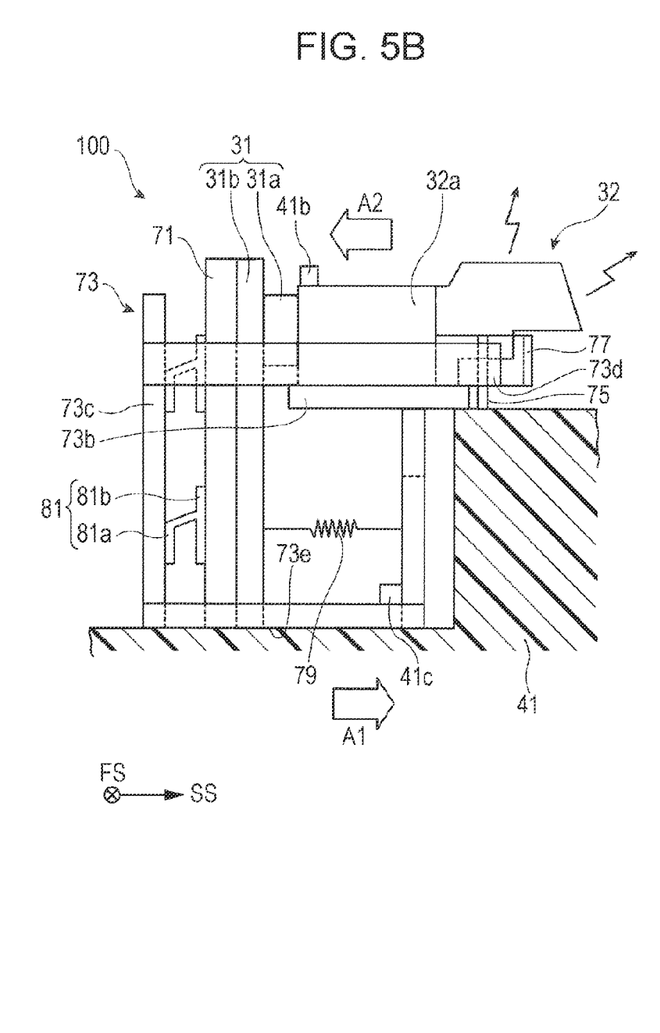

Referring to FIGS. 5A and 5B, the structure of the holding mechanism 100 will be described. FIGS. 5A and 5B illustrate an example of the structure of the holding mechanism 100. FIG. 5A is a top view of the holding mechanism 100, and FIG. 5B is a front view of the holding mechanism 100. Some components, such as a setting plate 73b and the optical housing 41, are not illustrated in FIG. 5B.

As described above, the light emitting element array 31*a* is fixed to the light-emitting-side circuit board 31*b*, and the light-emitting-side circuit board 31*b* is fixed to the optical housing 41. The light guide 32 is disposed on the setting plate 73*b* (described below) so as to be in contact with the light emitting element array 31*a*.

In the present exemplary embodiment, the light guide 32 is disposed so as to be movable over the setting plate 73*b* (or the optical housing 41). To be more specific, a restriction member 41*b*, which is fixed to the optical housing 41, is disposed opposite the setting plate 73*b* with the light guide 32 therebetween (above the light guide 32 in FIG. 5B). Due to the presence of the restriction member 41*b*, the light guide 32 is prevented from being moved in a direction in which the light guide 32 becomes separated from the setting plate 73*b* (or the optical housing 41). On the other hand, the light guide 32 is movable in directions in which the light guide 32 contacts and becomes separated from the light emitting element array 31*a* (the direction SS).

The light emitter 31, which is an example of a light emitter, and the holding mechanism 100, which holds the light guide 32, are disposed in the optical housing 41, which is an example of a body. The holding mechanism 100 includes a heat dissipation plate 71, a bracket 73, a pair of shafts 75, a pair of levers 77 (described below in detail), a pair of springs 79, and ground conductors 81. The heat dissipation plate 71 dissipates heat transferred from the light-emitting-side circuit board 31*b*, which is an example of a circuit board. The bracket 73, which is an example of a first portion, is disposed so as to be movable over an inner surface of the optical housing 41. The shafts 75, which are examples of a supporting unit, are disposed on the optical housing 41. The levers 77, which are examples of a second portion and a leverage member, are rotatable around the shafts 75. The springs 79, which are examples of an urging unit, generate forces that press the light guide 32 against the light emitter 31. The ground conductors 81 transfer heat from the heat dissipation plate 71 to the bracket 73. The bracket 73 and the levers 77 correspond to a pressing unit.

The heat dissipation plate 71, which is an example of a heat dissipation unit, is a plate that is made of a metal such as a stainless steel or aluminium and that extends along the light-emitting-side circuit board 31*b*. In the example illustrated in FIGS. 5A and 5B, the heat dissipation plate 71 is bonded to a surface of the light-emitting-side circuit board 31*b* that is opposite to a surface to which the light emitting element array 31*a* is fixed. Heat generated by the light emitting element array 31*a* is transferred to the heat dissipation plate 71 through the light-emitting-side circuit board 31*b*. The heat dissipation plate 71 dissipates the heat transferred from the light-emitting-side circuit board 31*b* to the outside.

The bracket 73 is a frame-like component that is made of a non-electroconductive material (for example, a plastic such as polypropylene (PP), polystyrene (PS), a polyacetal resin (POM), or the like). As described above, the bracket 73 is disposed so as to be movable over an inner surface of the optical housing 41.

The bracket 73 includes a pair of facing portions 73*a*, the setting plate 73*b*, a pressing plate 73*c*, a pair of pressing ends 73*d*, and a bottom portion 73*e*, which are integrated with each other. The facing portions 73*a* face end portions 31*b*1 of the light-emitting-side circuit board 31*b* in the main scanning direction FS. The setting plate 73*b* is a plate on which the light guide 32 is placed. The pressing plate 73*c* extends along the heat dissipation plate 71. The pressing ends 73*d* press parts of the levers 77 as described below. The bottom portion 73*e* is in contact with the optical housing 41. In the example illustrated in FIGS. 5A and 5B, the light guide 32 is placed on the setting plate 73*b* of the bracket 73. However, the bracket 73 may be disposed in any appropriate manner as long as the light guide 32 is capable of moving toward and away from the light-emitting-side circuit board 31*b*. For example, the light guide 32 may be disposed on the optical housing 41.

A restriction member 41*c* (see FIG. 5B), which is fixed to the optical housing 41, is disposed opposite the optical housing 41, which is in contact with the bottom portion 73*e* of the bracket 73, with the bracket 73 therebetween (above the bracket 73 in FIG. 5A). Due to the presence of the restriction member 41*c*, the bracket 73 is prevented from being moved in a direction in which the bottom portion 73*e* becomes separated from the optical housing 41. On the other hand, the bracket 73 is movable in directions in which the facing portions 73*a* is moved toward and away from the light-emitting-side circuit board 31*b* (in the direction SS).

The shafts 75, which are cylindrical members fixed to the optical housing 41, are disposed near respective ends of the light-emitting-side circuit board 31*b* in the main scanning direction FS.

The levers 77 are plate-shaped members that are rotatable around the shafts 75 (see arrows B). As illustrated in FIG. 5A, first ends 77*a* of the levers 77 are in contact with the pressing ends 73*d*. Second ends 77*b* of the levers 77 are in contact with the ends 32*a* of the light guide 32 in the main scanning direction FS. To prevent the lever 77 from blocking light emitted from the light emitting element array 31*a*, the second ends 77*b* of the levers 77 are in contact with portions of the light guide 32 through which the light does not pass.

First ends of the springs 79 are connected to surfaces of the end portions 31*b*1 that are parts of the surface of the light-emitting-side circuit board 31*b* to which the light emitting element array 31*a* is fixed. Second ends of the springs 79 are connected to the facing portions 73*a* of the bracket 73. The springs 79 are compression springs that generate forces in a direction in which the facing portions 73*a* is moved away from the light-emitting-side circuit board 31*b*. To be more specific, in the example illustrated in FIGS. 5A and 5B, the springs 79 generate forces that press the facing portions 73*a* in the direction SS.

In FIG. 5B, the springs 79 are disposed on lower parts of the light-emitting-side circuit board 31*b*, and the light emitting element array 31*a* is disposed on an upper part of the light-emitting-side circuit board 31*b*. Deflection of the light-emitting-side circuit board 31*b* is restrained, because the springs 79 and the light emitting element array 31*a* are disposed on respective end portions of the light-emitting-side circuit board 31*b* in the vertical direction. When, for example, the lower end of the light-emitting-side circuit board 31*b* is fixed to the optical housing 41, the bracket 73 is reliably pressed by disposing the springs 79 on lower parts of the light-emitting-side circuit board 31*b*, because inefficient use of the forces of the springs 79 due to deflection of the light-emitting-side circuit board 31*b* is reduced.

The ground conductors 81 are made of an electroconductive material, such as a stainless steel or copper. As illustrated in FIG. 53, each of the ground conductors 81 includes a contact portion 81*a* and a joining portion 81*b*. The contact portion 81*a* has a plate-spring like shape and generates a reaction force by elastically deforming when pressed. The joining portion 81*b* has a joining surface that is soldered to the heat dissipation plate 71. The ground conductors 81 have a spring constant lower than that of the springs 79 and are more easily deformed than the springs 79.

Structure of Lever 77 and Surrounding Components

Figure 6:
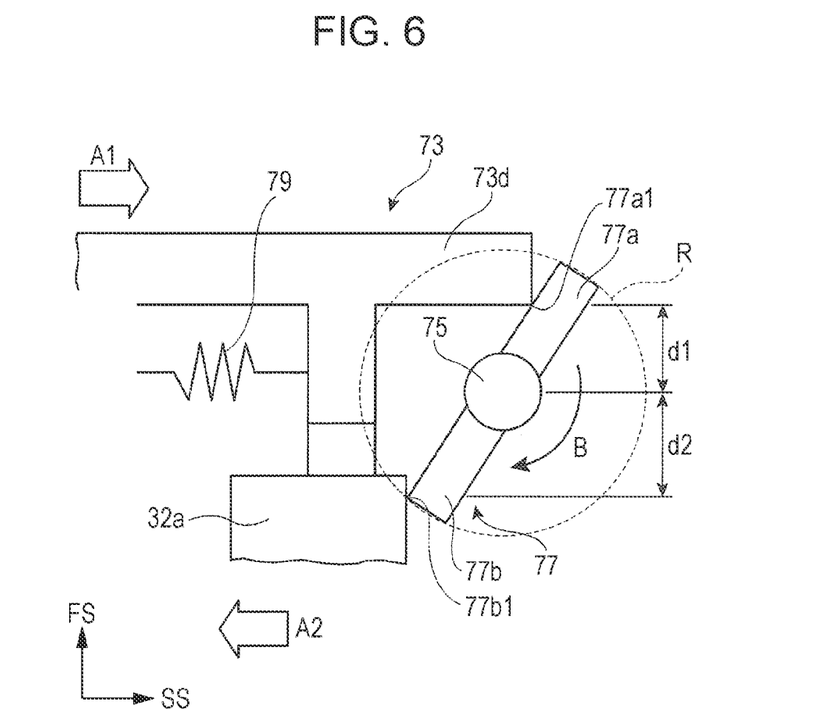
FIG. 6 illustrates an example of the structure of a lever and components surrounding the lever.

Referring to FIG. 6, the structure of the lever 77 and components surrounding the lever 77 will be described. FIG. 6 illustrates an example of the structure of the lever 77 and components surrounding the lever 77. FIG. 6 illustrates one of the pair of levers 77 illustrated in an upper part of FIG. 5A. The other lever 77 illustrated in a lower part of FIG. 5A has the same structure.

As illustrated in FIG. 6, a portion of the first end 77a of the lever 77 that is pressed by the pressing end 73d of the bracket 73 will be referred to as a "pressed portion 77a1", and a portion of the second end 77b of the lever 77 that presses the end 32a of the light guide 32 will be referred to as a "pressing portion 77b1". In the present exemplary embodiment, the pressed portion 77a1, the shaft 75, and the pressing portion 77b1 are arranged in this order with distances therebetween (see the distances d1 and d2) in a direction that intersects (is perpendicular to) the direction in which the spring 79 presses the bracket 73 (see arrow A1, described below).

To be more specific, the pressed portion 77a1 of the lever 77, at which the lever 77 receives a force from the pressing end 73d of the bracket 73, is displaced from the shaft 75, which serves as a fulcrum, in a direction that intersects the direction of the received force (see arrow A1). Therefore, a moment is generated in the lever 77; and the pressing portion 77b1, which serves as a point of application, is moved in a direction (see arrow A2, described below) that is opposite to the direction of the force received by the pressed portion 77a1 (see arrow A1).

The pressing end 73d of the bracket 73 and the end 32a of the light guide 32 are disposed in a region R in which the lever 77 rotates. As a result, even if the relative positions of the pressing end 73d, the end 32a, and the shaft 75 are misaligned, the lever 77 is capable of contacting the pressing end 73d of the bracket 73 and the end 32a of the light guide 32 and is capable of pressing the light guide 32 is a direction (see arrow A2, described below) opposite to the direction of the force that the lever 77 receives from the bracket 73 (see arrow A1).

Operation of Holding Mechanism 100

Referring to FIGS. 5A to 6, the operation of the holding mechanism 100 will be described.

The intensity of light radiating from the light emitting element array 31a decreases in the air at a rate that is inversely proportional to the square of the distance from the light emitting element array 31a. Therefore, for example, if there is a gap is formed in the range of 0.1 to 0.2 mm between the light emitting surface of the light emitting element array 31a and the light guide 32, illuminance at a document M irradiated with the light decreases considerably. Moreover, for example, if the distance between the light emitting surface of the light emitting element array 31a and the light guide 32 is not uniform, the illuminance at the document M may vary in the main scanning direction FS, the quality of read images may differ between different apparatuses, and the signal-to-noise ratio may decrease.

As illustrated in FIG. 5A, in the present exemplary embodiment, the holding mechanism 100 holds the light emitting element array 31a and the light guide 32 by applying forces in directions in which the light emitting surface of the light emitting element array 31a and the light guide 32 are pressed against each other.

To be specific, the light-emitting-side circuit board 31b is fixed to the optical housing 41 as described above. The springs 79, which are compression springs connected to the end portions 31b1 of the light-emitting-side circuit board 31b, press the facing portions 73a in a direction away from the light-emitting-side circuit board 31b (see arrows A1). Accordingly, the pressing ends 73d of the bracket 73 press the first ends 77a of the levers 77, and thereby the levers 77 receive forces that rotate the levers 77 in the directions of arrows B. Because the levers 77 receive such forces, the second ends 77b of the levers 77 press the ends 32a of the light guide 32 in a direction toward the light-emitting-side circuit board 31b (see arrows A2). Thus, the holding mechanism 100 applies forces that press the light emitting surface of the light emitting element array 31a, which is disposed on the light-emitting-side circuit board 31b, and the light guide 32 against each other.

As a result of the springs 79 pressing the bracket 73 in the direction of arrows A1, the pressing plate 73c of the bracket 73 presses the heat dissipation plate 71 toward the light-emitting-side circuit board 31b through elastic forces of the ground conductors 81. Thus, generation of a gap between the light-emitting-side circuit board 31b and the heat dissipation plate 71 is restrained. The holding mechanism 100 is a mechanism that holds the light-emitting-side circuit board 31b, the light guide 32, and the heat dissipation plate 71 together as an integrated unit by using compressive forces of the springs 79.

Because the bracket 73 and the ground conductors 81 are in contact with each other, heat is transferred from the heat dissipation plate 71 through the ground conductors 81 to the bracket 73, and thereby heat is efficiently dissipated from the heat dissipation plate 71.

To be specific, if the distance between the light-emitting-side circuit board 31b and the heat dissipation plate 71 is nonuniform, the temperatures of parts of the light-emitting-side circuit board 31b that are not in contact with the heat dissipation plate 71 may become higher than those of parts of the light-emitting-side circuit board 31b that are in contact with the heat dissipation plate 71. That is, the temperature distribution of the light-emitting-side circuit board 31b may become nonuniform. In such a case, the thermal conditions of the light emitting elements (not shown) of the light emitting element array 31a may differ from each other depending on the positions of the light emitting elements. Moreover, because the chromaticities of light emitted by the light emitting elements may change from those in the initial stage of emission, the color-difference between the colors of a read image may be influenced by such a change and thereby a color difference along the blue-yellow axis may occur.

The direction in which the light guide 32 applies a force to the light-emitting-side circuit board 31b through the light emitting element array 31a and the direction in which the springs 79 apply forces to the light-emitting-side circuit board 31b are the same direction, which is indicated by arrows A2. Therefore, deflection of the light-emitting-side circuit board 31b is smaller than in a case where forces in different directions are applied to different parts of the light-emitting-side circuit board 31b, and thereby the light emitting element array 31a and the light guide 32 are prevented from being separated from each other due to deflection of the light-emitting-side circuit board 31b.

The light guide 32 is not fixed to the optical housing 41 in order to position the light guide 32 with respect to the light emitting element array 31a. Therefore, even if the optical housing 41 becomes deflected due to, for example, the influence of heat or the like, separation of the light emitting element array 31a from the light guide 32 is prevented. To be more specific, for example, a screw hole or the like for fixing the position of the light guide 32 is not formed in the light guide 32, and therefore deflection of the light guide 32 that may occur when forming a screw hole or the like is prevented.

Modifications

Figure 7A:
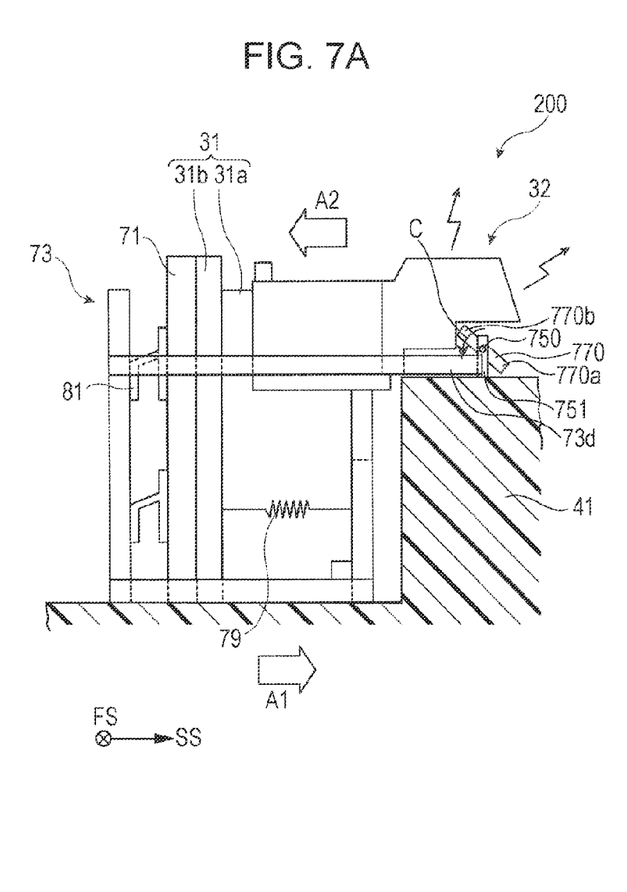
FIGS. 7A and 7B illustrate modifications of the present exemplary embodiment.
Figure 7B:
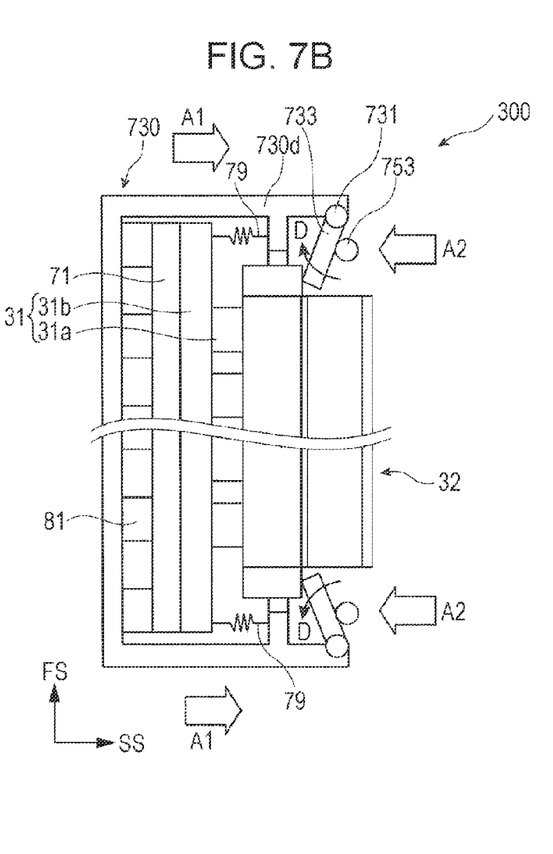

Referring to FIGS. 7A and 7B, modifications of the present exemplary embodiment will be described.

FIGS. 7A and 7B illustrate modifications of the present exemplary embodiment. FIG. 7A is a front view of a holding mechanism 200 according to a first modification, and FIG. 7B is a top view of a holding mechanism 300 according to a second modification.

In the exemplary embodiment described above, the holding mechanism 100 holds both ends of the light guide 32 in the main scanning direction FS from the outside of the light guide 32 in the main scanning direction FS. However, the holding mechanism 100 may have a different structure as long as the holding mechanism 100 holds the light guide 32 while contacting portions of the light guide 32 through which light does not pass.

As illustrated in FIG. 7A, the holding mechanism 200 includes a shaft 750 extending in the main scanning direction FS, a supporting unit 751 that supports the shaft 750 so as to fix the shaft 750 to the optical housing 41, and a lever 770 that is rotatable around the shaft 750 (see arrow C). The pressing end 73d of the light guide 32 presses a first end 770a of the lever 770 in the direction of arrow A1, and a second end 770b of the lever 770 presses the light guide 32 in the direction of arrow A2. The lever 770 may be disposed at each end of the light guide 32 in the main scanning direction FS or may be disposed at a middle portion of the light guide 32 in the main scanning direction FS.

In the exemplary embodiment described above, the levers 77 of the holding mechanism 100 press the light guide 32 against the light emitting element array 31a. However, the holding mechanism 100 may have a different structure as long as the pressed portion 77a1, which receives a force from a part of the bracket 73 in the direction of arrow A1, and the shaft 75, which serves as a fulcrum, are displaced from each other in a direction that intersects the direction of arrow A1.

As illustrated in FIG. 7B, the holding mechanism 300 includes movable ends 733 and shafts 753. The movable ends 733 are connected to pressing ends 730d of a bracket 730 through connection portions 731 and extend toward a middle portion of the holding mechanism 300 in the main scanning direction FS. The shafts 753 are disposed downstream of the movable ends 733 in the sub-scanning direction SS and are fixed to the optical housing 41. When the pressing ends 730d of the bracket 730 are pressed in the direction of arrow A1, the movable ends 733 rotate in the directions of arrows D while being supported by the shafts 753 and thereby press the light guide 32 in the direction of arrows A2.

Operation of Image Reading Apparatus 1

Referring to FIGS. 1 to 3, an operation performed by the image reading apparatus 1 to read a document M will be described.

First, the platen cover 60 of the image reading apparatus 1 is opened, a document M (see FIG. 2) is placed on the document plate 52 of the document table 50 of the body 10, and then the platen cover 60 is closed. Subsequently, when receiving an instruction to start reading, the image reading apparatus 1 starts reading the document M.

When the reading operation is started, electric power for causing the light emitting element array 31a of the light emitter 31 to emit light is supplied to the reading unit 40 through the cable unit 25. Moreover, when the reading operation is started, the drive motor 24 starts rotating and the reading unit 40 moves from the home position P1 toward the end position P2 in the sub-scanning direction SS.

During this time, light emitted from the light emitter 31 of the reading unit 40 passes through the light guide 32, and the document M on the document plate 52 is irradiated with a part of the light that is directly guided toward the document M and a part of the light that is reflected by the reflector 33 toward the document M. Reflected light from the document M is reflected by the first to fifth mirrors 34a to 34e, passes through the lens 35, and is focused onto the light receiving element array 36a. The light receiving element array 36a, which includes sensors that are linearly arranged in the main scanning direction FS as described above, outputs light receiving data for each of lines extending in the main scanning direction FS every time the lines are successively read in the sub-scanning direction SS.

Therefore, from the time when the reading unit 40 started moving from the home position P1 to the time when the reading unit 40 reaches the end position P2, the light receiving element array 36a successively outputs light receiving data for one line extending in the main scanning direction FS at predetermined intervals, and thereby read image data for one sheet of the document M is obtained. The read image data, which is output from the light receiving element array 36a, is transferred to the cable unit 25 through the light-receiving-side circuit board 36b, and is further transferred from the cable unit 25 to an external apparatus through a connection device (not shown) and the interface unit 26 (see FIG. 3).

In the description above, the image reading apparatus 1 is independently operated. However, this is not necessarily the case. For example, the image reading apparatus 1 may be included in an image forming apparatus such as a copier, a printer, or a facsimile that uses an electrophotographic system to form color or monochrome images; and the image reading apparatus 1 may be operated when the image forming apparatus performs an image forming operation.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
    a body;
    a circuit board fixed to the body;
    a light emitter disposed on a first surface of the circuit board, the light emitter emitting light with which a document is irradiated;
    a light guide disposed opposite the circuit board with the light emitter therebetween, the light emitted from the light emitter passing through the light guide;
    an urging unit;
    a supporting unit fixed to the body; and
    a pressing unit including a first portion and a second portion, the first portion being pressed in a direction from the light emitter toward the light guide as a result of receiving a force from the urging unit, the second portion pressing the light guide against the light emitter as a result of receiving a reaction force from the supporting unit when the first portion is pressed.

2. The image reading apparatus according to claim 1, further comprising:

a heat dissipation unit disposed on a second surface of the circuit board, the heat dissipation unit dissipating heat of the circuit board, wherein the pressing unit presses the heat dissipation unit against the circuit board when the first portion is pressed by the urging unit.

3. The image reading apparatus according to claim 1, wherein a first end of the urging unit is attached to the first surface of the circuit board and a second end of the urging unit presses the first portion of the pressing unit in a direction from the light emitter toward the light guide.

4. An image reading apparatus comprising:

a body;

a circuit board fixed to the body;

a light emitter disposed on a first surface of the circuit board, the light emitter emitting light with which a document is irradiated;

a light guide disposed opposite the circuit board with the light emitter therebetween, the light emitted from the light emitter passing through the light guide;

an urging unit; and a leverage member including a pressed portion, a fulcrum, and a point of application, the pressed portion being pressed in a direction from the light emitter toward the light guide as a result of receiving a force from the urging unit, the fulcrum being fixed to the body, the point of application pressing the light guide against the light emitter.

5. An optical unit comprising:

a body;

a circuit board fixed to the body;

a light emitter disposed on a first surface of the circuit board, the light emitter emitting light with which a document is irradiated;

a light guide disposed opposite the circuit board with the light emitter therebetween, the light emitted from the light emitter passing through the light guide;

an urging unit;

a supporting unit fixed to the body; and a pressing unit including a first portion and a second portion, the first portion being pressed in a direction from the light emitter toward the light guide as a result of receiving a force from the urging unit, the second portion pressing the light guide against the light emitter as a result of receiving a reaction force from the supporting unit when the first portion is pressed.

\* \* \* \* \*